US008385900B2

(12) United States Patent
Trigui

(10) Patent No.: US 8,385,900 B2
(45) Date of Patent: Feb. 26, 2013

(54) SELF-OPTIMIZING NETWORKS FOR FIXED WIRELESS ACCESS

(75) Inventor: Hafedh Trigui, Ottawa (CA)

(73) Assignee: Reverb Networks, Ashburn, VA (US)

( * ) Notice: Subject to any disclaimer, the term of this patent is extended or adjusted under 35 U.S.C. 154(b) by 342 days.

(21) Appl. No.: 12/634,057

(22) Filed: Dec. 9, 2009

(65) Prior Publication Data

US 2011/0136478 A1  Jun. 9, 2011

(51) Int. Cl.
*H04M 3/00* (2006.01)
(52) U.S. Cl. ............................ 455/418; 370/468; 455/513
(58) Field of Classification Search ................... 455/418, 455/422.1, 513, 134, 135, 161.3, 226.2, 226.3, 455/517, 522, 524, 525, 67.11, 69, 73, 562.1, 455/101, 423, 67.13; 370/331, 332, 334, 370/338, 339
See application file for complete search history.

(56) References Cited

U.S. PATENT DOCUMENTS

| | | | |
|---|---|---|---|
| 5,425,051 A | 6/1995 | Mahany | |
| 5,796,722 A | 8/1998 | Kotzin et al. | |
| 5,802,144 A | 9/1998 | Laird et al. | |
| 5,859,839 A | 1/1999 | Ahlenius et al. | |
| 6,051,408 A | 4/2000 | Bartsch et al. | |
| 6,069,871 A | 5/2000 | Sharma et al. | |
| 6,138,016 A | 10/2000 | Kulkarni et al. | |
| 6,141,565 A | 10/2000 | Feuerstein et al. | |
| 6,253,077 B1 * | 6/2001 | Burt et al. ...................... 455/424 |
| 6,400,335 B1 | 6/2002 | Weaver et al. | |
| 6,549,529 B1 | 4/2003 | Drabeck et al. | |
| 6,574,477 B1 | 6/2003 | Rathunde | |
| 6,829,491 B1 | 12/2004 | Yea et al. | |
| 6,937,863 B1 | 8/2005 | Gordon et al. | |
| 6,999,766 B1 | 2/2006 | Padovani | |
| 7,016,685 B1 | 3/2006 | Cain et al. | |
| 7,149,478 B2 | 12/2006 | Hawe | |
| 7,260,415 B1 | 8/2007 | Oh | |
| 7,349,765 B2 | 3/2008 | Reaume et al. | |
| 7,477,920 B2 * | 1/2009 | Scheinert et al. ............. 455/561 |
| 7,561,876 B2 | 7/2009 | Chiou et al. | |
| 7,577,103 B2 | 8/2009 | Diaz et al. | |
| 7,606,287 B2 | 10/2009 | Mahany | |

(Continued)

FOREIGN PATENT DOCUMENTS

| | | |
|---|---|---|
| EP | 2129175 | 12/2010 |
| EP | 1952657 | 8/2011 |

OTHER PUBLICATIONS

International Search Report issued Jun. 18, 2010 in International (PCT) Application No. PCT/US2010/31603.

(Continued)

*Primary Examiner* — Meless N Zewdu
*Assistant Examiner* — Gerald Oliver

(57) ABSTRACT

An embodiment of the invention relates to a method of modifying communication parameters of a wireless network, the wireless network having at least two antennas, and each of the antennas providing coverage to at least one sector. The method including obtaining measurement data for at least two sectors of the wireless network, determining, from the obtained measurement data, if a signal strength indicator of one or more sectors of the at least two sectors is at or below a target value, determining, if the one or more sectors is at or below the target value, a communication parameter to be applied to the wireless network such that the signal strength indicator of the one or more sectors is above the target value, and modifying the communication parameters of the wireless network such that the determined communication parameter is applied to the wireless network.

22 Claims, 10 Drawing Sheets

U.S. PATENT DOCUMENTS

| | | | |
|---|---|---|---|
| 7,609,747 | B2 | 10/2009 | Mahany |
| 7,623,455 | B2 | 11/2009 | Hilla et al. |
| 7,653,407 | B2 | 1/2010 | Backes et al. |
| 7,768,968 | B2 | 8/2010 | Plehn et al. |
| 7,877,095 | B2 | 1/2011 | Hubner et al. |
| 7,877,108 | B2 | 1/2011 | Wengerter et al. |
| 7,904,080 | B2 | 3/2011 | Atkins et al. |
| 7,941,136 | B2 | 5/2011 | Reed et al. |
| 7,969,896 | B2 | 6/2011 | Sheinfeld et al. |
| 8,023,529 | B2 * | 9/2011 | Oh et al. .................. 370/468 |
| 2003/0100344 | A1 * | 5/2003 | Garmonev et al. ........... 455/562 |
| 2003/0191856 | A1 | 10/2003 | Lewis et al. |
| 2003/0229478 | A1 | 12/2003 | Rappaport et al. |
| 2004/0018839 | A1 | 1/2004 | Andric et al. |
| 2004/0196834 | A1 | 10/2004 | Ofek et al. |
| 2004/0229621 | A1 | 11/2004 | Misra |
| 2004/0266442 | A1 | 12/2004 | Flanagan et al. |
| 2005/0176440 | A1 | 8/2005 | Sang et al. |
| 2005/0243723 | A1 | 11/2005 | Randriamasy |
| 2005/0259571 | A1 | 11/2005 | Battou |
| 2005/0277444 | A1 * | 12/2005 | Rensburg et al. .......... 455/562.1 |
| 2006/0083170 | A1 | 4/2006 | Silva et al. |
| 2006/0221886 | A1 | 10/2006 | Rao |
| 2006/0239224 | A1 | 10/2006 | Borst et al. |
| 2006/0246844 | A1 | 11/2006 | Kroboth et al. |
| 2007/0002765 | A1 | 1/2007 | Kadaba et al. |
| 2007/0021151 | A1 | 1/2007 | Mori et al. |
| 2007/0066298 | A1 | 3/2007 | Hurst |
| 2007/0094729 | A1 | 4/2007 | Hoefelmeyer et al. |
| 2007/0147297 | A1 | 6/2007 | Diaz et al. |
| 2007/0195721 | A1 | 8/2007 | Backes et al. |
| 2007/0218862 | A1 | 9/2007 | Tatman et al. |
| 2007/0248039 | A1 | 10/2007 | Backes et al. |
| 2008/0020801 | A1 | 1/2008 | Fesas et al. |
| 2008/0039089 | A1 | 2/2008 | Berkman et al. |
| 2008/0207195 | A1 | 8/2008 | Ranta et al. |
| 2008/0225714 | A1 | 9/2008 | Denis |
| 2008/0268833 | A1 | 10/2008 | Huang et al. |
| 2008/0311924 | A1 | 12/2008 | Lucidarme |
| 2009/0003236 | A1 | 1/2009 | Aoyama et al. |
| 2009/0023477 | A1 * | 1/2009 | Staudte .................. 455/562.1 |
| 2009/0036116 | A1 | 2/2009 | Kim et al. |
| 2009/0047968 | A1 | 2/2009 | Gunnarsson et al. |
| 2009/0075648 | A1 | 3/2009 | Reed et al. |
| 2009/0075655 | A1 | 3/2009 | Dobson et al. |
| 2009/0131038 | A1 | 5/2009 | MacNaughtan et al. |
| 2009/0163223 | A1 | 6/2009 | Casey |
| 2009/0221297 | A1 | 9/2009 | Wengerter et al. |
| 2009/0227261 | A1 | 9/2009 | Tiirola et al. |
| 2009/0257353 | A1 | 10/2009 | Song et al. |
| 2009/0264130 | A1 | 10/2009 | Catovic et al. |
| 2009/0312022 | A1 | 12/2009 | Viorel et al. |
| 2009/0315736 | A1 | 12/2009 | Reichl et al. |
| 2009/0323530 | A1 | 12/2009 | Trigui et al. |
| 2010/0008293 | A1 | 1/2010 | Gupta et al. |
| 2010/0046369 | A1 | 2/2010 | Zhao et al. |
| 2010/0075682 | A1 | 3/2010 | del Rio-Romero |
| 2010/0103911 | A1 | 4/2010 | Ji |
| 2010/0124934 | A1 | 5/2010 | Mach |
| 2010/0130194 | A1 | 5/2010 | Dickey |
| 2010/0149984 | A1 | 6/2010 | Kapoor et al. |
| 2010/0159936 | A1 | 6/2010 | Brisebois et al. |
| 2010/0190488 | A1 | 7/2010 | Jung et al. |
| 2010/0203881 | A1 | 8/2010 | del Rio Romero et al. |
| 2010/0216453 | A1 | 8/2010 | Kallin et al. |
| 2010/0232318 | A1 | 9/2010 | Sarkar |
| 2010/0254344 | A1 | 10/2010 | Wei et al. |
| 2010/0278161 | A1 | 11/2010 | Ore et al. |
| 2010/0299419 | A1 | 11/2010 | Ramankutty et al. |
| 2011/0009105 | A1 | 1/2011 | Lee et al. |
| 2011/0014925 | A1 | 1/2011 | Antic et al. |
| 2011/0028144 | A1 | 2/2011 | Catovic et al. |
| 2011/0044165 | A1 | 2/2011 | Ni et al. |
| 2011/0045865 | A1 | 2/2011 | Viering et al. |
| 2011/0092195 | A1 | 4/2011 | Hussein et al. |
| 2011/0096687 | A1 | 4/2011 | Dottling et al. |
| 2011/0105139 | A1 | 5/2011 | On |
| 2011/0130135 | A1 | 6/2011 | Trigui |
| 2011/0141972 | A1 | 6/2011 | Oh et al. |

OTHER PUBLICATIONS

Office Action dated Oct. 13, 2010 issued in related U.S. Appl. No. 12/385,752.

Office Action dated May 5, 2011 issued in related U.S. Appl. No. 12/385,752.

International Search Report and Written Opinion of the International Searching Authority issued Nov. 3, 2010 in International (PCT) Application No. PCT/US2010/048927.

International Search Report and Written Opinion of the International Searching Authority issued Nov. 15, 2010 in International (PCT) Application No. PCT/US2010/048929.

International Search Report issued Nov. 24, 2010 in International (PCT) Application No. PCT/US2010/050627.

U.S. Office Action mailed Dec. 22, 2011 for U.S. Appl. No. 12/718,189, filed Mar. 5, 2010.

Aminjoo et al., "Cell outage Management in LTE Networks," COST 2100 TD(9)941, Vienna, Austria, Sep. 28-30, 2009.

Mueller et al., "A Cell Outage Detection Algorithm Using Neighbor Cell List Reports Wanke" 2008.

U.S. Office Action mailed Feb. 27, 2012 for U.S. Appl. No. 12/385,752, filed Apr. 17, 2009.

U.S. Final Office Action mailed Jul. 13, 2012 for U.S. Appl. No. 12/385,752, filed Apr. 17, 2009.

* cited by examiner

700
Exemplary Resource Allocation (TDD)

800
Exemplary Resource Allocation (FDD)

SELF-OPTIMIZING NETWORKS FOR FIXED WIRELESS ACCESS

BACKGROUND OF THE INVENTION

1. Field of the Invention

The present invention relates generally to the field of wireless networking, and more specifically to self-optimizing networks for fixed wireless access.

2. Description of the Related Art

Traditional network dimensioning and planning rely on expected peak traffic demand of each geographical zone know as busy hour traffic. Static approaches may be used, prior to actual deployment, to predict the required number of pieces of equipment and their locations to satisfy the traffic demand. Additionally, simplified in-house developed models and sophisticated commercial tools could be used during the multiple network planning phases.

The planning process starts with identifying the number of base stations, their best locations, and configurations to achieve coverage, capacity, and quality of service requirements. In most cases, the service provider is limited to existing or predefined site locations because acquiring new sites is becoming more difficult due to increasing concerns about mobile telephony by both the government and the public, and the finite number of tall buildings in a city. Additionally, cellular towers in rural areas are typically subject to zoning approval by local municipalities. As such, site locations are typically shared by more than one service provider.

Due to the continued need for capacity increase and broadband services, existing sites are forced into hosting more equipment for existing or new technologies to satisfy the demand. However, some of the existing sites are becoming congested and it may not be possible to easily add more equipment without altering existing services or neighbors' networks. Therefore, different planning techniques have emerged to help alleviate the current constraints.

For example, a natural solution to increase the capacity of a cellular system without adding new sites is to implement high-order sectorization in hotspot areas where capacity is needed.

In high-order sectorization, the higher the number of sectors per site the greater the number of handover region, which results in less effective sectorization gain. For example, from all to three and six sectors, the effective sectorization gains are 2.5 and 4.3, respectively. However, handover is not supported for fixed wireless access because subscribers are fixed or slowly moving in a bounded area such as inside of buildings. As such, high-order sectorization gains will be close to ideal, that is, proportional to the number of sectors.

It should be noted that more capacity is needed in dense urban environments when the angular spread of multi-path components is approximately 30 degrees. Transmitting with narrow beams from the basestations will radiate power to adjacent sectors and create interference. As such, it is not recommended to deploy antennas with half-power beamwidth less than 30 degrees for sectors serving subscribers in dense urban environments.

Additionally, each sector needs a downlink preamble, or an equivalent control channel, to facilitate the synchronization of served mobile terminals and the identification of used cell/segment and fast fourier transform ("FFT") size for orthogonal frequency division multiplexing ("OFDM") systems such as WiMAX. Measurements are made on the preamble and reported to the basestation for link adaptation purposes such that the modulation and coding scheme is adjusted according to the quality of the wireless channel between the basestation and the subscriber. For a tight frequency reuse ratio, which is normally the case in dense urban environments, a small number of pseudo-noise ("PN") sequences may cause a serious limitation in finding a subset with the best cross-correlation properties. Further, a fixed WiMAX system has a single preamble sequence used in all the sectors of the network. As such, adjacent sectors cannot overlap and use the same RF frequency channel because subscribers in the overlapping zones will then suffer from co-channel interference and may not be able to synchronize. Some care must be taken for sectors pointing to each other if the sectors have to deploy the same frequency channel; in other words, overlap has to be avoided by tilting the antennas, reducing the basestation transmit power, or by any additional means.

Further, traffic density is time varying and not uniform such that much of the additional equipment may not carry any significant traffic the majority of the time, which dramatically degrades the expected spectrum efficiency of a high-order sectorization system. Even in wireless systems where the subscribers are fixed, traffic unbalance may occur as a result of adding and removing subscribers over time as well as the changing of subscriber service level agreements ("SLA") affecting required bandwidth. Therefore, there exists a need to change the boundaries of the coverage areas to balance traffic loads and improve overall network performance.

Additionally, RF network planning for cellular wireless systems is complex because many assumption have to be made regarding path loss models, propagation channels, traffic demand, subscribers' density, subscribers' profiles in supporting a variety of services and tariff plans, mobility profile, and indoor v. outdoor subscribers. In order to achieve good predicted results, the assumptions have to be continuously validated by performing drive tests and analyzing huge amounts of data to model subscribers' behaviors, and reflect this learning back into the predictions. As such, RF planning is iterative and continuous because network optimization engineers must take into account recent network changes.

Fixed wireless standards were recently enacted as a broadband alternative to digital subscriber line ("DSL") and asymmetric digital subscriber lines ("ADSL"). Additionally, there exists commercial equipments in the market that do not follow a particular standard and an operator must purchase basestations and subscriber equipment from the same vendor or run the risk that no one else provides interoperable equipment. One example of the above in a pre-WiMAX system with fixed subscribers is iBurst. Additionally, other fixed wireless systems include IEEE802.16d or IEEE802.16e when the subscriber stations are roof-top mounted or used in constrained mobility scenarios (i.e., inside homes, offices, or the like).

For fixed wireless systems following a standard (such as IEEE802.16d or IEEE802.16e as described above), some commercial planning tools have provided new modules to implement the specific features of the air interfaces (e.g. OFDM and orthogonal frequency division multiple access ("OFDMA")) and supported the fixed nature of subscribers by allowing for subscriber lists rather than generating subscribers randomly to follow predetermined traffic maps. However, the structure of the planning tools and the adopted methodologies were kept the same for new air interfaces and, unlike mobile cellular systems, most of the complexity is not required.

Despite the availability of the planning tool, many small service providers prefer adhoc and heuristic planning for fixed wireless systems rather than paying for expensive RF tools and performing a multitude of tests to calibrate at least the path loss models and propagation assumptions in order to properly apply the planning tools. The same adhoc method apply to fixed wireless systems that do not follow a particular standard especially if the equipment vendors do not supply RF network planning tools.

In view of the above, there exists a need for simplified RF network planning tools for fixed wireless systems that do not use complicated assumptions and, preferably, rely on actual measured data and equipment performance. The desired RF planning tool would also be used for dimensioning as well as for finer adjustments after install, and, further, could be used as a real-time load balancing apparatus to achieve the best network performance at any given time.

SUMMARY OF THE INVENTION

An embodiment of the invention relates to a method of modifying communication parameters of a wireless network, the wireless network having at least two antennas, and each of the antennas providing coverage to at least one sector. The method including obtaining measurement data for at least two sectors of the wireless network, determining, from the obtained measurement data, if a signal strength indicator of one or more sectors of the at least two sectors is at or below a target value, determining, if the one or more sectors is at or below the target value, a communication parameter to be applied to the wireless network such that the signal strength indicator of the one or more sectors is above the target value, and modifying the communication parameters of the wireless network such that the determined communication parameter is applied to the wireless network.

An embodiment of the invention relates to a computer readable storage medium having a program stored thereon that when executed causes a computer to perform a method of modifying communication parameters of a wireless network, the wireless network having at least two antennas, and each of the antennas providing coverage to at least one sector. The method including obtaining measurement data for at least two sectors of the wireless network, determining, from the obtained measurement data, if a signal strength indicator of one or more sectors of the at least two sectors is at or below a target value, determining, if the one or more sectors is at or below the target value, a communication parameter to be applied to the wireless network such that the signal strength indicator of the one or more sectors is above the target value, and modifying the communication parameters of the wireless network such that the determined communication parameter is applied to the wireless network.

An embodiment of the invention relates to a system of providing wireless access. The system including a server interface for modifying communication parameters of the wireless network, the wireless network having at least two antennas, and each of the antennas providing coverage to at least one sector, the server interface is operable to obtain measurement data for at least two sectors of the wireless network, determine from the obtained measurement data, if a signal strength indicator of one or more sectors of the at least two sectors is at or below a target value, determine if the one or more sectors is at or below the target value, a communication parameter to be applied to the wireless network such that the signal strength indicator of the one or more sectors is above the target value, and modify the communication parameters of the wireless network such that the determined communication parameter is applied to the wireless network. The system further includes an element management system, two or more basestations controlled by said element management system, and two or more antenna controllers controlled by the two or more basestations, respectively, and for controlling the at least two antennas. The at least two antennas provide service to a plurality of customer premise equipment.

An embodiment of the invention includes a server interface for modifying communication parameters of the wireless network, the wireless network having at least two antennas, and each of the antennas providing coverage to at least one sector. The server interface is operable to obtain measurement data for at least two sectors of the wireless network, determine from the obtained measurement data, if a signal strength indicator of one or more sectors of the at least two sectors is at or below a target value, determine if the one or more sectors is at or below the target value, a communication parameter to be applied to the wireless network such that the signal strength indicator of the one or more sectors is above the target value, and modify the communication parameters of the wireless network such that the determined communication parameter is applied to the wireless network.

DETAILED DESCRIPTION OF THE INVENTION

Figure 1:
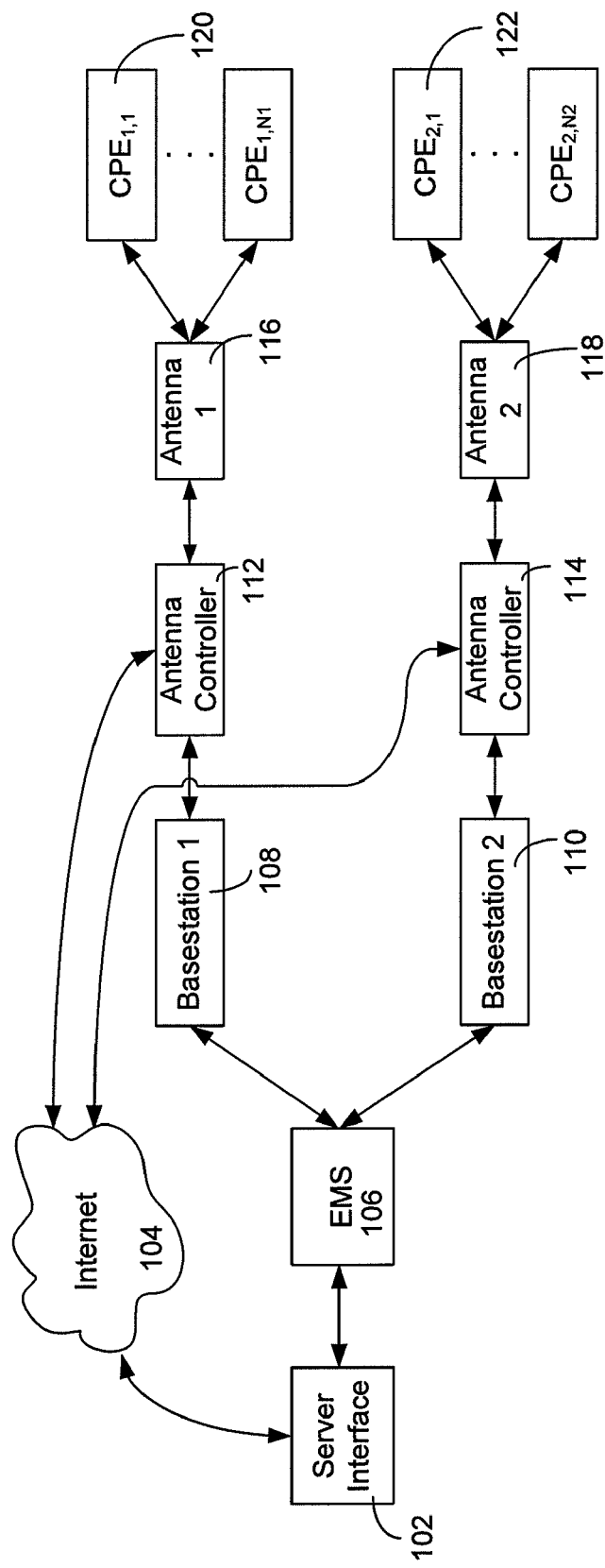
FIG. 1 illustrates an exemplary high-level implementation of a fixed wireless network in accordance with an embodiment of the invention.

FIG. 1 illustrates an exemplary high-level implementation of a fixed wireless network of the present invention. A server interface 102 having PC software loaded with the self-optimizing algorithm of the present invention interfaces with the vendor's element management system ("EMS") 106. The EMS functions to control the basestations 108, 110 as well as possibly other equipment not shown. Each of the basestations 108, 110 control respective antennas 116, 108 via antenna controllers 112, 114. Additionally, the server interface 102 may directly access the antenna controllers 112, 114 via the interne 104 to receive measurements confirming those taken by the EMS 106 or to directly control the antenna controllers 112, 114. Each of the antennas 116, 118 provides service to customer premise equipment 120, 121 ("CPE"), such as subscriber stations ("SS"), within the antennas 116, 118 respective coverage area.

Figure 2:
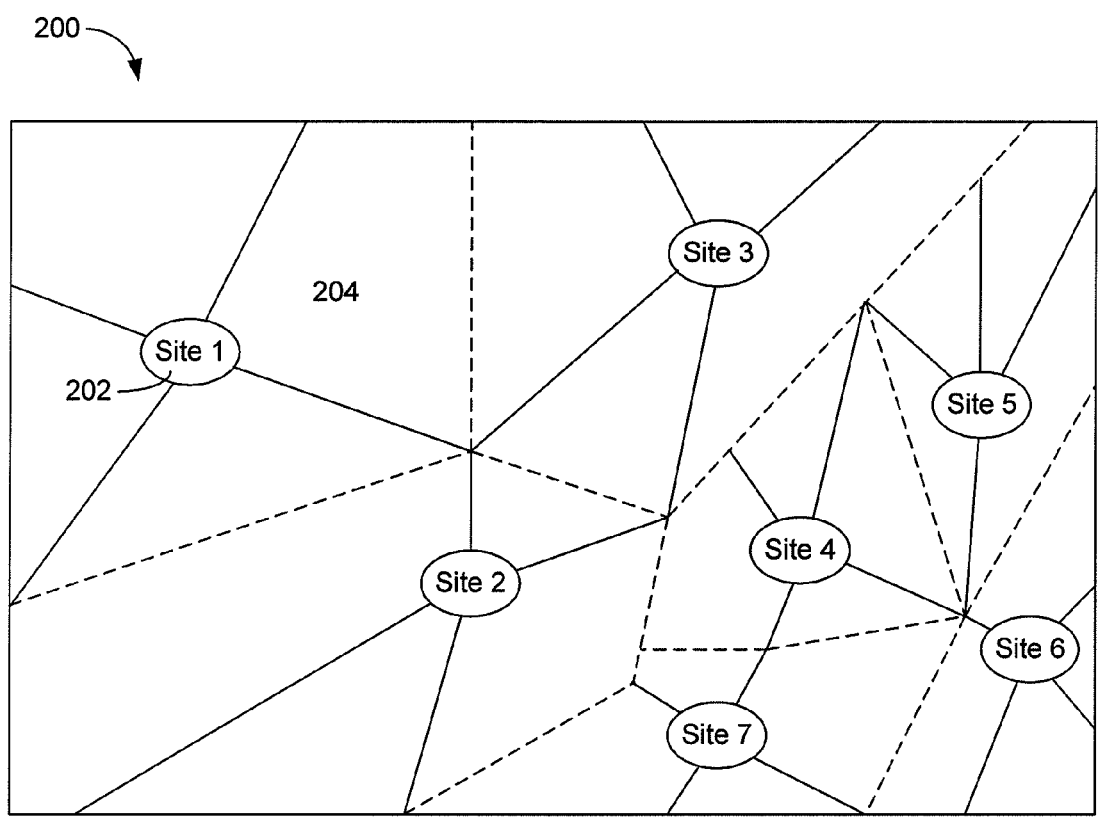
FIG. 2 illustrates an exemplary coverage map for quad-sector sites of a fixed wireless access network in accordance with an embodiment of the invention.

FIG. 2 illustrates an exemplary coverage map 200 for quad-sector sites 202 of a fixed wireless access network. Each sector 204 of the quad-sector sites 202 is represented by an irregular shape that takes into consideration: 1) RF parameters such as transmit power, antenna radiation patter, RF frequency channel, modulation and coding scheme, equipments' noise figure, and the like; 2) propagation parameters such as terrain, building type, building height, building materials, tree, and the like; and 3) topology such as basestation and subscriber station heights and exact location of basestations and subscriber stations.

It should be noted that the sectors 204 of the coverage map 200 could be approximated as Voronoi cells. Therefore, a load balancing algorithm could be employed to simply move vertexes of the sectors 204 to balance traffic at the network level. Additionally, because subscriber locations are always know for fixed wireless systems, the impact of adding or removing one or more subscribers to a particular sector can be readily evaluated. For example, the impact could be evaluated by computing the expected minimum average user throughput for the targeted sector in which subscribers were added or removed. Typically, the vertexes of a few of the sectors 204 are adjusted to address local congestion problems, but the vertexes of all the sectors 204 could be changed to dramatically affect network performance, if such a change was desired. The algorithm of the present disclosure relies on carrier to interface plus noise ratio ("CINR"), which is very predictable when changing antenna-related parameters and/or basestation transmit power.

Figure 3:
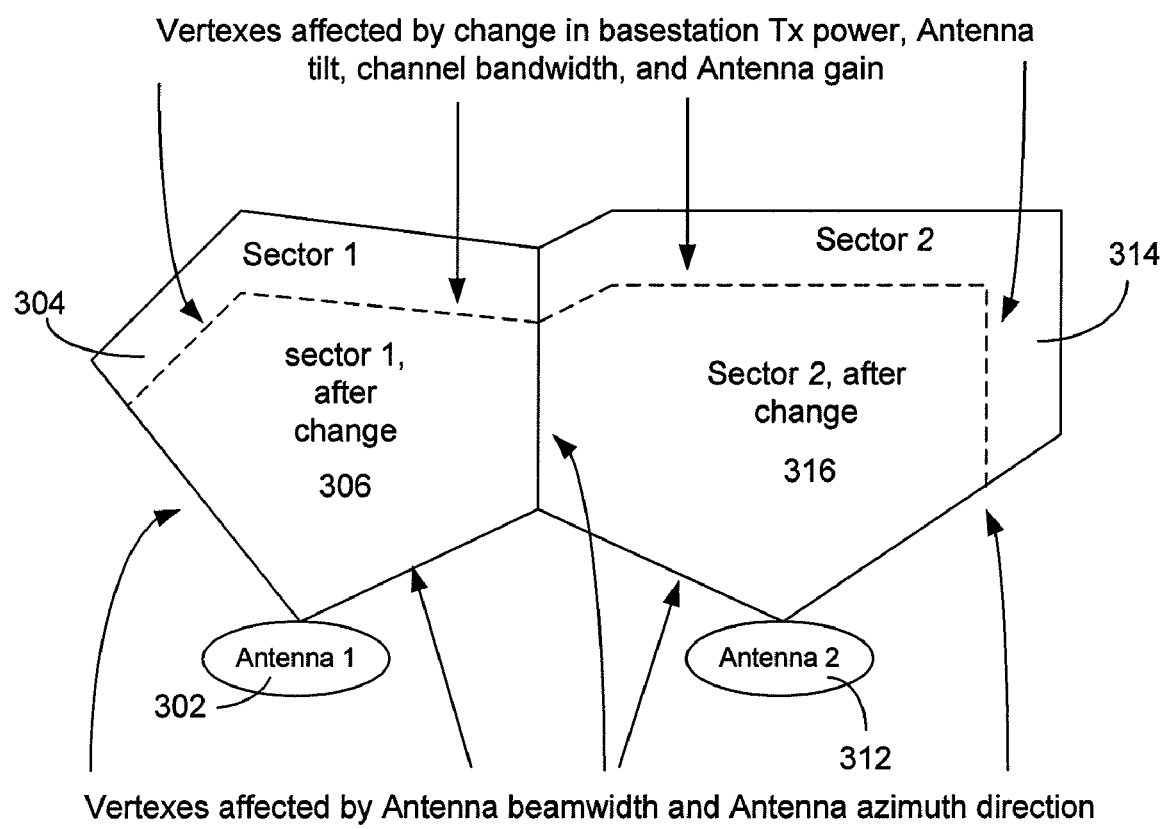
FIG. 3 illustrates exemplary sectors for a pair of antennas before and after changes to the vertexes of the coverage areas in accordance with an embodiment of the invention.

FIG. 3 illustrates exemplary sectors for a pair of antennas 302, 312 before and after changes to the vertexes of the coverage areas. Based on the capacity of the antenna for each sector (e.g. antenna 1 302 for sector 1 304, and antenna 2 312 for sector 314), few or all vertexes of the coverage area could be modified. For example, changing the electrical or mechanical tilt could increase or decrease the sector reach which translates into moving one or more vertexes related to the sector reach. Additionally, if the azimuth beamwidth of the antenna could be adjusted then the lateral vertexes could move to increase or decrease the coverage. Further, some antennas may control the azimuth pointing direction and, as such, the coverage area for each sector is altered according to the new pointing angle. However, the coverage area could be affected by surrounding sectors. It should also be noted that sector reach would be impacted by basestation transmit power ("BS Tx power"), channel bandwidth, and multicarriers.

As noted above, FIG. 3 provides exemplary coverage sectors for a pair of antennas 302, 312 before and after changes to the vertexes of the coverage area. Specifically, antenna 1 302 has a sector 1 304, and antenna 2 312 has a sector 2 314 before altering the respective vertexes of the sectors. After decreasing the reach of the sectors, antenna 1 has a sector 1 306, and antenna 2 312 has a sector 316. Additionally, FIG. 3 includes the vertexes affected by change in basestation Tx power, antenna tilt, channel bandwidth, and antenna gain; and the vertexes affected by change in antenna beamwidth, and antenna azimuth direction.

For fixed wireless access systems where subscribers use high gain directional antennas, changing sector reach by means of antenna tilt and/or BS Tx power may not be practical as abandoned subscribers from one sector could not be reliably connected to the closest neighbor serving as the best sector without rotating the subscribers' antennas. However, it could be acceptable to change subscribers' antenna rotation as a part of yearly, or less frequent, network maintenance or upgrade. It should be noted that this should not be viewed as a limitation because with adjustable azimuth beamwidth and azimuth pointing direction control, traffic could be appropriately balanced to achieve the desired results. For example, when the azimuth beamwidth increases, the antenna array gain is reduced proportionally and, therefore, any headroom in the BS Tx power would be valuable to maintain the sector reach.

Subscriber stations ("SS") are typically equipped with high gain directional antennas to reduce interference and also facilitate achieving high order modulation. Normally, SS antennas are installed by a qualified technician and, afterward, generally remain untouched. During installation, SS antenna azimuth and elevation angles are adjusted until the best received signal strength indicator ("RSSI") and carrier to interface plus noise ratio ("CINR") are obtained; once obtained, the SS antenna is set into place and setup is complete. The SS is configured for at least the frequency band, center RF frequency, channel bandwidth, base station identify ("BSID"), and for standards associated with frequency division duplex ("FDD") or time division duplex ("TDD") systems.

Additionally, to guarantee a reliable communication between a serving sector and a subscriber, especially in the UL direction, the RSSI at the base station should be as close as possible to a specific target value ("BS RSSI Target"). Subscribers further away from the BS need to transmit at a higher power to compensate for higher link loss. This transmit power adjustment capability is governed by the automatic transmit power control ("ATPC" algorithm). The ATPC algorithm allows the SS to adaptively adjust their power level and, as RF characteristic change, the SS adjusts its transmit power to maintain the BS RSSI Target. Changing the width of the antenna pattern or the tilt value will change the link gain between the BS and the SS, and, as a result, the SS will adjust its transmit power to maintain the BS RSSI Target. Typically, the automatic power control algorithm converges very fast to account for any variation in the link as a result of antenna parameter changes or fading due to propagation phenomena.

The transmit power of the basestation ("BS Tx Power") and the BS RSSI Target are the main parameters set via the vendor's element management system that controls the basestations and possibly other equipment. Other parameters, particularly transmit SS power ("SS Tx Power"), could be calculated and used as a check for the reported measurements from the EMS. The link loss, also known as path loss, between an SS and a BS is computed as: LinkLoss=BS Tx Power−RSSI, where RSSI is the received signal strength indicator as measured by the SS and reported back to EMS. Accordingly, the transmit power from the CPE can be computed as SS Tx Power=BS RSSI Target+LinkLoss. CPE and SS are used in the invention interchangeably.

Because the base station antenna gain is a part of the link loss and varies as a function of the beamwidth or down tilt value, it is possible to predict the impact of changing antenna parameters on RSSI, CINR and SS Tx Power, which is important to the load-balancing algorithm.

It should be noted that due to known subscribers locations in fixed wireless systems, quality metrics such as DL RSSI, DL CINR, UL RSSI and UL CINR for each subscriber are essentially deterministic. As a result, the effect of channel fading, rain, and other factors will cause those metrics to be random variables with known distributions. The distribution of each random variable could be shown after gathering enough statistics within a day or so. If network configuration parameters remain unchanged and no subscribers have been added or removed from the network, the distributions of the random variables are almost static.

Changing BS antenna parameters will mainly affect the mean values of DL RSSI and DL CINR and, as a result, simply shift the distribution function, or equivalently the mean value, by a predefined amount. The UL RSSI value will fluctuate around the BS RSSI Target because of the SS automatic power control algorithm. UL CINR distribution will be affected by the density of subscribers as well as BS antenna parameters and, particularly, the antenna beamwidth.

Wider beamwidth results in higher co-channel interference and, as a result, lower CINR value. However, considering that directional antennas are typically used for SS and that co-channel SS are further away than the desired SS which means higher link loss to the BS of the desired SS, UL CINR variations are bounded and do not significantly affect UL performance. Therefore, the quantities of interest for the self-optimized networks (SON) algorithm are DL RSSI and DL CINR, which could be interchangeable in most scenarios where co-channel interference could be neglected.

Because the maximum SS power is finite, it is not possible for a SS to increase its power indefinitely to cope with increased link loss and/or decreased BS transmit power or antenna gain. Subscribers closer to sector edge are transmitting with a power that could be close to the maximum possible. When a SS transmits at its maximum power and the link loss is increased, UL RSSI will fall below BS RSSI Target and, as a result, the UL performance could be degraded. Therefore, monitoring TxPowerSS is essential for a robust SON algorithm.

Alternatively, when it is preferable to operate some subscribers at their maximum power, to maximize overall network performance, the degradation in UL CINR is computed after transmitting at maximum power, i.e., UL CINR degradation is predicted from the reduced antenna gain as a result of tilting or changing azimuth beamwidth and, also, from any reduction in BS transmitted power if applicable.

Although UL and DL data rates (also known as throughputs) are affected by changing network parameters, they cannot be considered for fast convergence SON algorithms because they also depend on traffic demand. For example, a subscriber may simply read emails on one day, heavily download files the next day, and upload photos and videos on the subsequent day, each causing a different traffic demand. Further, monthly averaged UL and DL data rate per subscriber will change as a result of changing activities throughout the seasons, subscriber vacation time, or the like. Therefore, it is better to rely, as to the dimensioning problem, on the expected UL and DL throughput for each subscriber; this is based on the assumption that all subscribers are served simultaneously. This could be considered the worst case scenario and the achievable UL and DL throughput shall be good enough to support the minimum services.

In most cases, the achievable throughputs could be much higher because many subscribers may be silent. The minimum achievable UL and DL throughputs could be predicted based on the number of the served subscribers, their CINR values, and the medium access layer ("MAC") scheduling algorithm implemented at the basestation.

In order for the SON algorithm to be understood, the relationship between DL throughput and DL CINR must be understood. This relationship can be found by link level simulations (WiMAX Forum and IEEE standard typically consider SNR rather than CINR), in the lab by means of a wireless setup and test equipments or in the field and usually in a line of sight ("LOS") environment. It should be noted that because equipment's performance may vary between vendors and/or different releases of software and/or hardware, it is preferable to consider actual measurements rather than simulations.

For the case of fixed WiMAX (IEEE802.16d), it is possible to allocate all the radio resources to the subscriber under test to quickly identify the average downlink sector throughput and record at the same time the modulation and coding scheme as well as DL CINR values. The results for a fixed WiMAX with DL/UL TDD ratio of 40/60 (the OFDM frame is split into a DL subframe and UL subframe occupying respectively 40% and 60% of the total frame duration) are summarized in the following table and shown in Table 1 below.

TABLE 1

Average DL Sector Throughput vs. DL CINR for exemplary equipment

| | Modulation and Coding Scheme | | | | |
|---|---|---|---|---|---|
| | QPSK 3/4 | 16 QAM 1/2 | 16 QAM 3/4 | 64 QAM 2/3 | 64 QAM 3/4 |
| CINR (dB) | 9 | 10 | 13 | 16 | 18 |
| Throughput (Mbps) | 2.7 | 3.6 | 5 | 6.8 | 7.7 |

As expected, the plot of sector throughput vs. DL CINR follows a linear curve at first order approximation. The slope of the line is nothing other than the ratio of the variation in throughput to the variation in CINR:

$$s = \frac{\Delta T}{\Delta CINR}.$$

$$s_{avg} = 0.55 \text{ Mbps/dB}$$

When $\Delta CINR$ takes the value of the antenna array gain, as a result of narrowing down the beamwidth for example, then the variation in data rate can be computed as $\Delta T = s \cdot \Delta CINR$ This allows the throughput gain to be computed as $$G_T = \frac{\Delta T}{T_0},$$

where $T_0$ is the throughput corresponding to the CINR value prior to applying the antenna array gain.

Additionally, it should be noted that because $\Delta T$ is constant, the highest gain is obtained for lower baseline throughput $T_0$. Accordingly, throughput gains vanish for subscribers experiencing very high CINR values, and when the available bandwidth was exhausted prior to improving antenna parameters (such as narrowing the beamwidth resulting in an antenna array gain).

When the antenna beamwidth is narrowed from 120 degrees to 30 degrees, 6 dB antenna array gain are expected. As an example, this 6 dB gain helps subscribers to be served in 64 QAM ⅔ rather than 16 QAM ½, or equivalently improves subscriber data rates by a factor of 1.9.

Additionally, it should be noted that the achieved throughput gains are maintained for other supported DL/UL ratios although the actual sector throughput values change. For example, with a time division duplex ("TDD") frame configuration of 50/50, the maximum downlink sector throughput is 9.3 Mbps or equivalently 20% increase with respect to its value at 40/60 configuration. Normally, the operator does not change the DL/UL TDD ratio unless traffic asymmetry has been dramatically changed across the entire network. When this rare event occurs then it suffices to take further measurements to characterize the throughput vs. CINR relationship.

Ideally, the load balancing algorithm is implemented jointly with MAC scheduling algorithms of each modem allowing optimization of the network throughput at any given time. However, this centralized fashion of implementing the algorithms increases the latencies experienced by the end users because MAC scheduling is not done at the sector level but at the network level. MAC scheduling at the network level results in having to take into account a much larger number of subscribers and subscriber specific traffic demands.

As a practical tradeoff, in an embodiment of the present invention, the MAC scheduling algorithm runs at the sector level to minimize latencies while a coordinated multi-cell load balancing algorithm is added to offload congested cells to try and achieve the best possible network performance.

However, the problem should still be considered as a network level MAC scheduling problem split into the following two steps:
1. The MAC scheduling algorithm is performed by each modem in real-time to serve the subscribers of a specific sector. This algorithm is vendor-specific and, as a result, its performance may vary across different equipment vendors. The preferred embodiment of the presented invention is mainly concerned about the type (proportional fair, maximum CINR . . . ) and the best approximation that could be done by means of lab or field experiments; and
2. The coordinated load balancing algorithm which is a network level multi-cell scheduling algorithm. This algorithm runs at a slower rate than the MAC scheduling algorithm and its main objective is to offload some sectors such that user experience will be improved. In this case, the algorithm runs indefinitely to maximize network performance. Additionally, the same algorithm could be used in the planning stage as a simplified and more accurate planning tool because it relies on actual equipment performance and takes into consideration the actual propagation as experienced by the subscribers or the basestations. The RSSI and CINR are actual measurements rather than estimated from path loss and propagation models. Before installing the SS, the service provider can rely on estimated of RSSI and CINR that result from empirical path loss models (for early SS installs) or improved models (validated after installing some SS in the area).

The throughputs used in the preferred embodiment are raw throughputs delivered by the MAC layer to the physical ("PHY") layer in the DL or as decoded by the PHY and delivered to the MAC layer in the UL direction. It should be understood that this is simply an exemplary choice and it is possible to define effective throughputs after removing the MAC layer overhead or even an application layer throughput.

Assume that the peak theoretical throughput for the $i^{th}$ modem in one direction (uplink or downlink) is $T_i$. For a user j connected to the $i^{th}$ modem, and based to its $CINR_{ij}$, the peak possible throughput if all the bandwidth is allocated the user is $T_{ij}$. An exemplary relationship between $CINR_{ij}$ and $T_{ij}$ is shown in Table 1 above, and as previously explained these values could be obtained by simulations, lab or field measurements.

Assume that the number of users in the $i^{th}$ sector, served by the $i^{th}$ modem, is $N_i$. If a proportional fair ("PF") scheduler was implemented in the $i^{th}$ modem then the average sector throughput would be $$\langle T_{ij} \rangle_j = \sum_{j=1}^{N_i} \frac{T_{ij}}{N_i}.$$

The minimum average user throughput would be $$t_i = \frac{\min_j T_{ij}}{N_i}.$$

Clearly higher number of users per sector reduces the minimum achievable average user throughput. Specifically to this scheduler, subscribers experiencing low CINR values because they are located at cell edges or their antennas are hid by tall buildings or trees will experience lower average throughputs than other subscribers that are closer to serving base station or experiencing better propagation and/or suffering from less interference. Therefore, an exemplary objective for the load balancing algorithm is to increase the minimum user throughput such that cell edge subscribers of a particular sector achieve similar performance to that of cell edge subscribers served by another sector.

Consider all the $N_i$ subscribers served by the $i^h$ modem, regardless of their actual activity, the SON algorithm behaves as a long-term coordinated scheduling algorithm. This could be more than enough when tracking slow changes in the network such as adding/removing users over time or when the average user throughput is almost the same over days or weeks.

To make the SON algorithm more dynamic, it is possible to constrain $N_i$ to the active subscribers of the $i^{th}$ sector. The activity factor could be determined by some metrics, for example, such as the subscriber was silent in the last 15 minutes. Alternatively, the activity profile for each user could be learned over time (e.g., data for each hour or day or week for one year period) and the activity profile is typically deterministic for most users. Changes tend to occur for specific events (e.g. breaking news, house guests, office increasing internet usage, or the like).

Additionally, many fixed wireless standards achieve better performance if neighboring sectors use different RF frequency channels because the modems do not have advanced mechanisms to cancel co-channel interference (CCI) and/or the subscribers cannot adequately synchronize to the modem if they suffer from excessive CCI. When the SON algorithm suggests moving some subscribers to a neighboring sector then it would be required to inform the subscribers of the new parameters such as a new BSID, RF frequency channel, etc. This forced handover could be implemented manually (by any means not limited to CLI commands) at the subscriber location or remotely from an EMS managing a plurality of basestations and their served subscribers.

Additionally, it should be noted that the scope of the present invention is not limited to fixed WiMAX or OFDM air interface, and should be readily understood by one of ordinary skill in the art that the present invention may be easily modified to cover any resource allocation in time, frequency, code, space, etc and any fixed wireless system regardless of being a standard or proprietary implementation.

Figure 4:
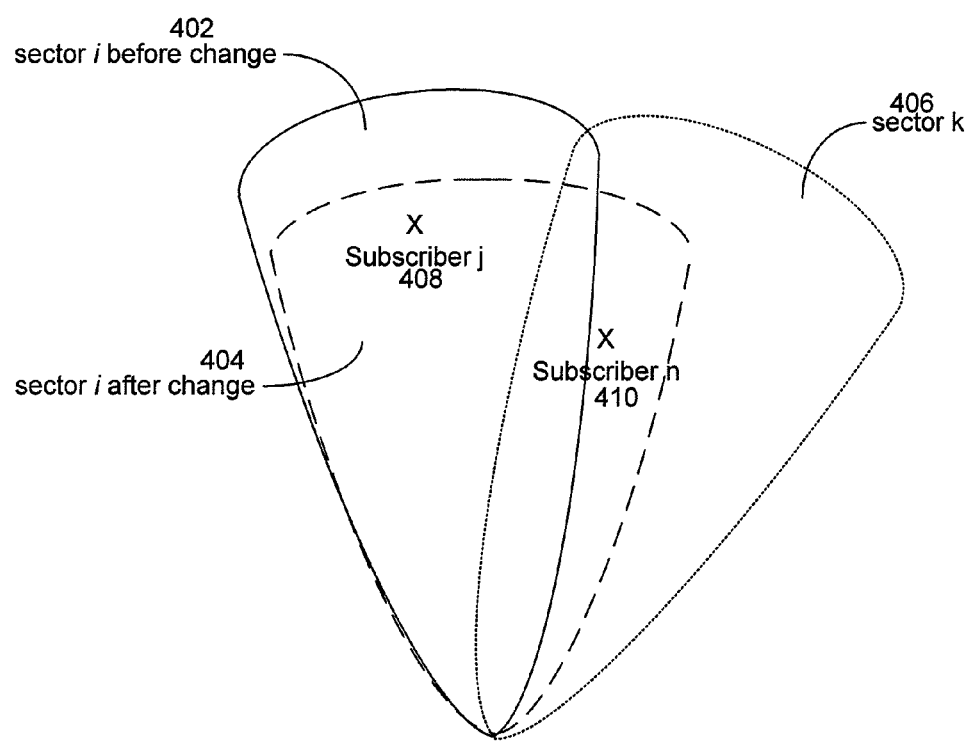
FIG. 4 illustrates an exemplary implementation in which a subscriber is moved from one sector to another for network optimization in accordance with an embodiment of the invention.

FIG. 4 illustrates an exemplary implementation of the present invention in which a subscriber is moved from one sector to another for network optimization. In FIG. 4, a subscriber j 408 is located in sector i 402 and a subscriber n 410 is located in sector k 406 before the network is optimized. Based on a determination by the self-optimizing network algorithm, it is decided that subscriber n 410 must be relocated to sector i 402 in order to improve network performance. Thus, the self-optimizing network algorithm adjusts the parameters of the antenna that has sector i 302 as a subsector such that sector i 404 after adjustment includes subscriber n 410. Additionally, FIG. 4 will be used below as an exemplary illustration of the locations of subscriber j 408 and subscriber n 410 within sector i 402 and sector k 406, respectively, before any changes.

Figure 5:
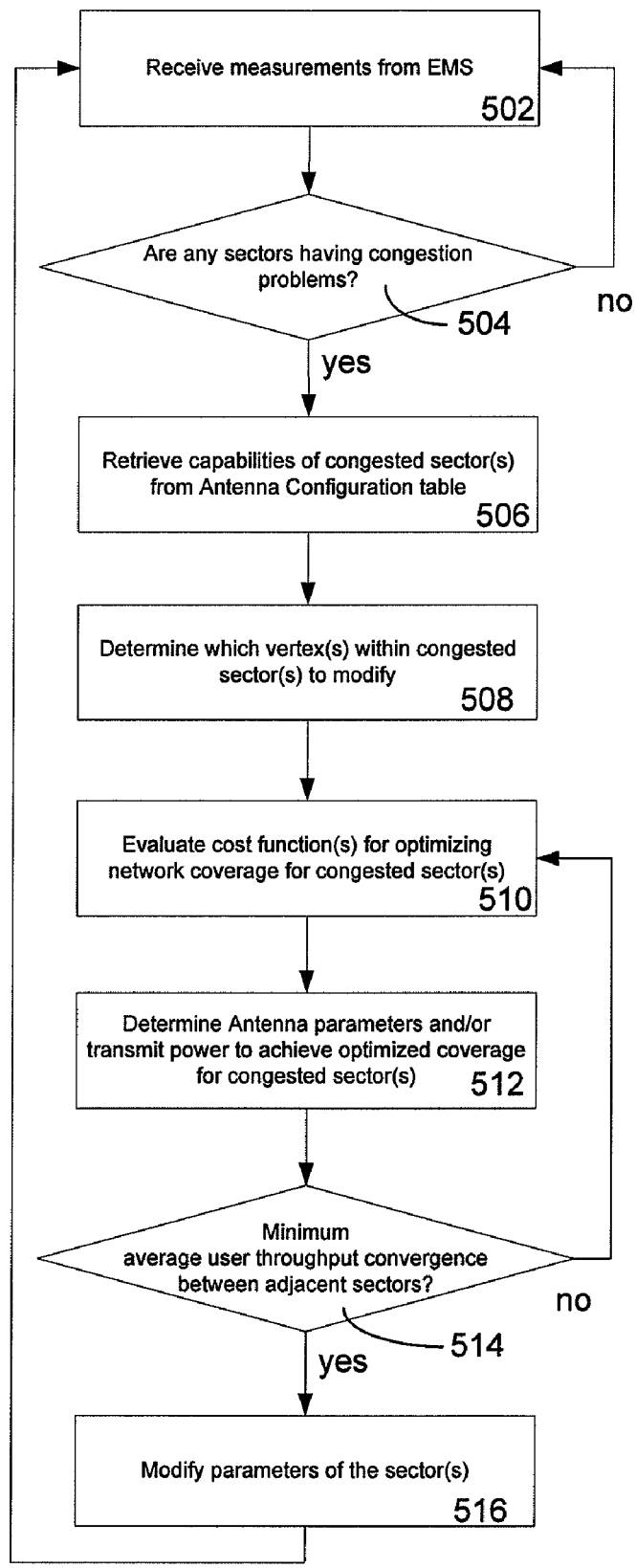
FIG. 5 illustrates a flowchart illustrating the load-balancing algorithm in accordance with an embodiment of the invention.

FIG. 5 illustrates a flowchart illustrating the load-balancing algorithm of the present invention. After initialization, at step 502, the algorithm receives measurements from the EMS 106. As described above, the measurements useful to the present invention include CINR, BS transmit power, SS transmit power, and UL/DL throughput.

At step 504, the algorithm examines the received measurements and makes a determination as to whether any of the sectors are currently experiencing congestion problems. If it is determined that congestions problems exist in one or more sectors, the algorithm moves on to step 506; if it is determined that no congested sectors exist, the algorithm returns to step 502.

At step 506, the algorithm retrieves the capabilities of one or more congested sectors from an Antenna Configuration table.

At step 508, the algorithm determines which vertexes within the one or more congested sectors to modify based on the retrieved capabilities from the Antenna Configuration table.

At step 510, the algorithm evaluates the cost functions for optimizing network coverage for the one or more congested sectors. The details of the evaluation will be described below with reference to FIG. 6.

At step 512, the algorithm determines antenna parameters (e.g. antenna gain) and/or transmit power (e.g. BS transmit power) to achieve the optimized coverage for the one or more congested sectors. The details of this determination will be described in more detail below.

At step 512, the algorithm makes a determination as to whether the determined parameter/transmit power from step 512 will result in minimum average user throughput convergence between adjacent sectors. If the algorithm determines that the determination of step 512 is successful it moves on to step 516 and applies the determinations of step 512 to the system; if not, the algorithm returns to step 510 to complete another iteration of the determination.

Figure 6:
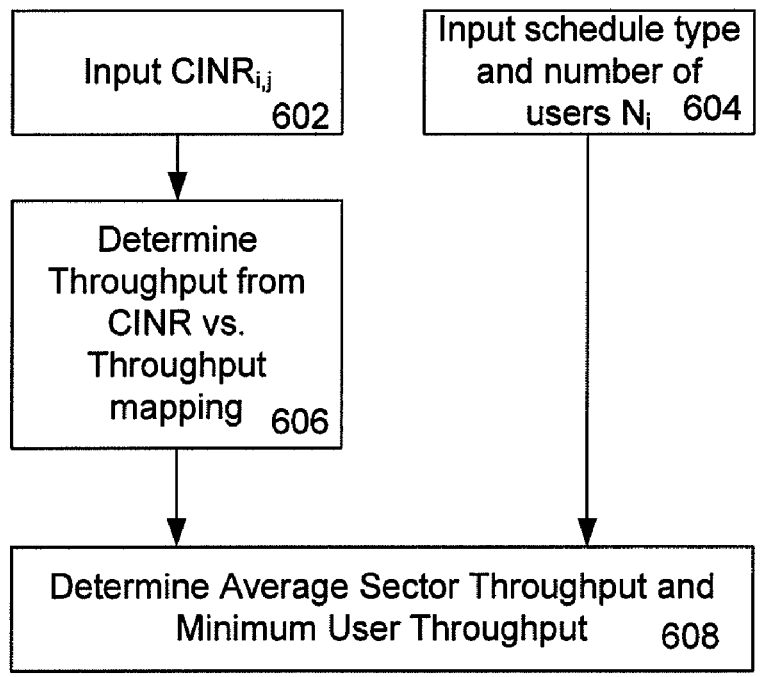
FIG. 6 illustrates a flowchart illustrating evaluating the cost function for optimizing network coverage in accordance with an embodiment of the invention.

FIG. 6 illustrates a flowchart illustrating evaluating the cost function for optimizing network coverage in accordance with the load balancing algorithm of the present invention. At step 602, the CINR for the $i^{th}$ user for the $j^{th}$ sector is input, and the algorithm proceeds to step 606 in which the throughput is determined from CINR v. throughput mapping as was described previously in the disclosure. At step 604, the algorithm retrieves the schedule type and the number of users $N_i$, the importance of which was previous described above.

Finally, at step 608, the algorithm determines the average sector throughput and minimum user throughput.

No Adjustment to Basestation Transmit Power

If the network has been designed with the maximum power capabilities of the basestations or with some fixed power levels to achieve a wanted coverage, then no adjustments to basestation power are allowed. As such, only alterations to antenna parameters may be performed.

Initially, if DL CINR is used as the key metric for balancing DL traffic loads among the cells of the hotspot zone, changing antenna patterns in co-channel interfering sites has a typically negligible effect on DL CINR than changing antenna pattern for the serving sector because co-channel interfering sites are further away from the served subscribers. As such, changing sector boundaries with a known amount could be translated into the equivalent changes in antenna parameters and/or BS power. The SON algorithm computes the predicted values of $CINR_{ij}^{DL}$ and $t_i$ for the concerned subscribers and sectors. One or more iterations could be required to achieve similar minimum average user throughput for the sectors subject to load balancing ($t_i \approx t_k$ for any adjacent sector i 404 and sector k 406 sharing an optimized vertex).

Looking to FIG. 4, and assuming that antenna parameter changes resulted in changing the antenna gain by $\Delta G_i$, Subscriber j 408, which does not need to be handed over to a neighboring sector, would see its $CINR_{ij}^{DL}$ changing by roughly $\Delta G_i$. However, subscriber n 410 of sector k 406, which is a candidate for handover to sector i 404, will see its $CINR_{kn}^{DL}$ changed to $CINR_{in}^{DL}$ with a variation of $(G_i-G_k)+\Delta G_i$. This simplistic exemplary implementation should not be viewed as limiting as it is possible to take into account the variation of interference and noise ratio due to parameter changes in co-channel interfering sites.

Alternatively, if the UL CINR is used as the key metric for balancing UL traffic loads among the cells of a hotspot zone, the above algorithm described for the DL CINR could be applied here apart from considering UL CINR for each subscriber and using the proper relationship between UL CINR and UL throughput similarly to Table 1 but with different values. However, as discussed above, and due to the automatic power control algorithm of the SS that compensates for changes in antenna gain and BS transmit power, the UL CINR remains constant if the subscriber is not transmitting at the maximum power.

Looking again to FIG. 4, but in the case of the UL direction, subscriber j 408, which does not need to be handed over to the neighboring sector, would see its TxPowerSS $p_j$ changing by $-\Delta G_i$ without exceeding the maximum allowed power $p_{max}$. The excess amount of power $\delta$, beyond $p_{max}$, shall be accounted as a decrease in $CINR_{ij}^{UL}$. Subscriber n 410 of sector k 406, which is a candidate for handover to sector i 404, will need to change its transmit power by $(G_k-G_i)-\Delta G_i$. If the resulted power exceeds $p_{max}$, then the excess amount $\delta$ shall be deducted from $CINR_{ij}^{UL}$ corresponding to $p_{max}$.

Additionally, rather that considering uplink or downlink only for load balancing, it is possible to consider the sum of the uplink and downlink throughputs or any linear or non-linear functions of those quantities. An exemplary linear function may consider weighting the uplink and the downlink proportionally to their subframe duration or actual average throughput to account for traffic asymmetry.

Possible Adjustment to Basestation Transmit Power

It is possible that the BS transmit power may be adjusted. This provides the benefit of trying to keep cell reach constant to counter the changes in antenna gain when adjusting the antenna parameters. It should be noted that adjusting the BS transmit power is only possible when the network, prior to applying load balancing, is not using the maximum available power for one or more of the sectors.

If the DL CINR is used at the key metric for balancing DL traffic loads among the cells of the hotspot zone, changing antenna patterns in co-channel interfering sites has a typically negligible effect on DL CINR as opposed to changing an antenna pattern for the serving sector. This is because co-channel interfering sites are further away from the served subscribers. As a result, changing sector boundaries with a known amount could be translated into equivalent changes in antenna parameters and/or BS power. This allows the SON algorithm to compute the predicted values of $CINR_{ij}^{DL}$ and $t_i$ the concerned subscribers and sectors. One or more iterations could be required to achieve similar minimum average user throughput for the sectors subject to load balancing ($t_i \approx t_k$ for any adjacent sectors i 404 and sector k 406 sharing an optimized vertex).

Looking to FIG. 4 and assuming that antenna parameters changes resulted in changing the antenna gain by $\Delta G_i$ and that the BS transmit power was changed by $\Delta P_i$. Subscriber j 408, which does not need to be handed over to a neighboring sector, would see its $CINR_{ij}^{DL}$ changing by roughly $\Delta G_i + \Delta P_i$. However, subscriber n 410 of sector k 406, subscriber n 410 being a candidate for handover to the sector i 404, will see its $CINR_{kn}^{DL}$ changed to $CINR_{in}^{DL}$ with a variation of $(P_i - P_k) + (G_i - G_k) + \Delta P_i + \Delta G_i$. This simplistic exemplary implementation should not be viewed as limiting as it is possible to take into account the variation of interference and noise ratio due to parameter changes in co-channel interfering sites.

Alternatively, if the UL CINR is used as the key metric for balancing UL traffic loads among the cells of a hotspot zone, the above algorithm described for the DL CINR could be applied here apart from considering UL CINR for each subscriber and using the proper relationship between UL CINR and UL throughput similarly to Table I but with different values. However, as discussed above, and due to the automatic power control algorithm of the SS that compensates for changes in antenna gain and BS transmit power, the UL CINR remains constant if the subscriber is not transmitting at the maximum power.

Looking again to FIG. 4, but in the case of the UL direction, subscriber j 408 does not need to be handed over to the neighboring sector would see its TxPowerSS $p_j$ changing by $-\Delta G_i - \Delta P_i$ without exceeding the maximum allowed power $p_{max}$. The excess amount of power $\delta$, beyond $p_{max}$, shall be accounted as a decrease in $CINR_{ij}^{UL}$. The subscriber n 410 of the sector k 406, which is a candidate for handover to the sector i 404, will need to change its transmit power by $(P_k - P_1) + (G_k - G_i) - \Delta P_i - \Delta G_i$. If the resulted power exceeds $p_{max}$, then the excess amount $\delta$ shall be deducted from $CINR_{ij}^{UL}$ corresponding to $p_{max}$.

Additionally, rather that considering uplink or downlink only for load balancing, it is possible to consider the sum of the uplink and downlink throughputs or any linear or non-linear functions of those quantities. An exemplary linear function may consider weighting the uplink and the downlink proportionally to their subframe duration or actual average throughput to account for traffic asymmetry.

After applying the changes (altering antenna parameters and/of BS transmit power) in one or more iterations as designated by the self-optimizing network algorithm, the actual uplink and downlink CINR measurements should be gathered for the subscribers served as well as the affected/affecting sector. Predicted minimum average user throughput for each sector could be computed to quickly check the validity of the load balancing algorithm.

Alternatively, if using a slowly changing self-optimizing network algorithm, a longer time could be taken to validate the load balancing algorithm. This allows the averaging out enough actual throughputs to use a measured throughput rather than predicted throughput. Additionally, slight changing subscriber behavior can be filtered out of the analysis.

Figure 7:
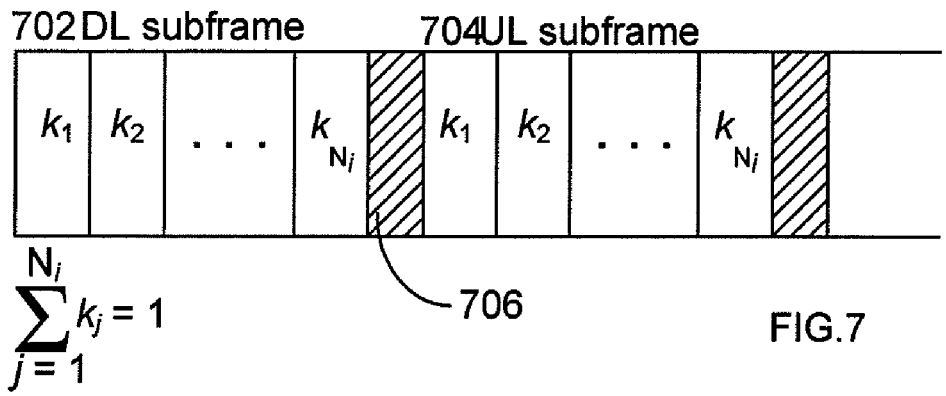
FIG. 7 illustrates an exemplary resource allocation for a time division duplex system in accordance with an embodiment of the invention.
Figure 8:
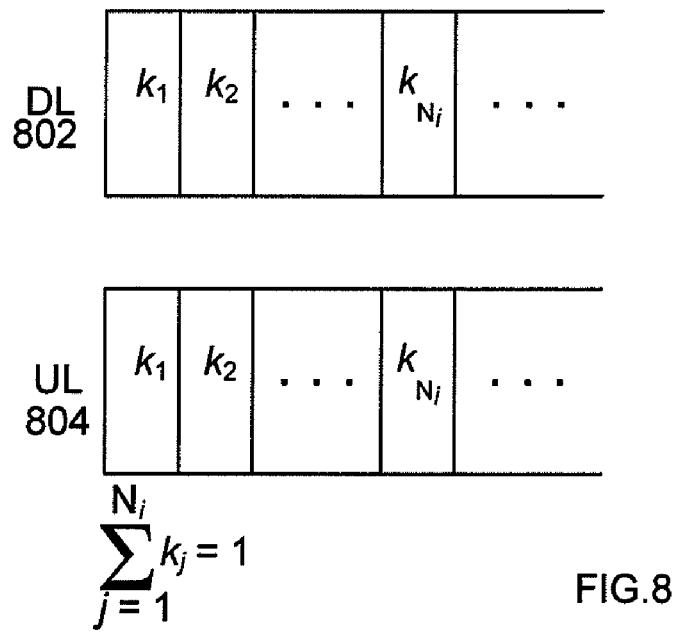
FIG. 8 illustrates an exemplary resource allocation for a frequency division duplex system in accordance with an embodiment of the invention.

For the proportional fair scheduler, radio resources were allocated evenly between the users of a single sector. FIGS. 7 and 8 illustrate the allocation of resources based on a time division duplex system ("TDD") and a frequency division duplex system ("FDD"), respectively. In such a case $$k_1 = k_2 = \ldots = k_{N_i} = \frac{1}{N_i}$$

and it is not expected that all subscribers achieve the same throughput, especially for those subscribers located near a cell edge and are operating at maximum transmit power, $p_{max}$. Uneven throughput distribution will be exaggerated when most of subscribers belonging to the same sector are scheduled simultaneously.

As noted above, FIG. 7 illustrates an exemplary resource allocation 700 for a time division duplex system. In TDD systems, the transmitter and receiver operate at the same frequency, as such, signals transmitted and received in a TDD system are not continuous in time. When a WiMAX signal is transmitted to an antenna, this time interval is referred to as the downlink subframe 702. When a WiMAX signal is received from the antenna, this time interval is referred to as the uplink subframe 704. Between transmit and receive intervals, gaps 706 are defined by the WiMAX standard. In both the downlink subframe 702 and the uplink subframe 704, radio resources must be allocated such that $$\sum_{j=1}^{N_i} k_j = 1.$$

FIG. 8 illustrates an exemplary resource allocation 800 for a frequency division duplex system. In FDD systems, the transmitter and receiver operate at different frequencies allowing for the simultaneous transmission of data along the uplink 804 and the downlink 800. Like a TDD system, radio resources must allocated in both the downlink 800 and uplink 804 such that $$\sum_{j=1}^{N_i} k_j = 1.$$

Additionally it is possible to allow for an uneven partitioning of radio resources to allow, for example, the served subscribers to experience almost similar throughput whatever their geographic location. Therefore the average sector throughput would be:

$$\langle T_{ij}\rangle_j = \sum_{j=1}^{N_i} k_j T_{ij},$$

and the minimum average user throughput is:

$$t_i = \min_j k_j T_{ij}.$$

As previously mentioned, $N_i$ could account for all the users, just the active users, or any preferred subset of users.

Further, the present invention is not limited to allotting resources based on only CINR values but may also take into account service level agreements ("SLAs") of individual subscribers. For simplicity, SLA can be a multiplicative coefficient on top of the classical proportional fair scheduler or any advanced generalized scheduler. As such, an exemplary implementation could rely on CINR values to evaluate $k_j$ assuming the same SLA for all users. $k_j$ and $\alpha_j k_j$ could then be changed for the specific SLA of the $j^{th}$ subscriber. For example, $\alpha_j=2$ indicates that this particular subscriber will receive twice as much radio resources as compared to a standard subscriber as dictated by the average bandwidth relationship in their respective SLAs. Of course, the resource allocation must be normalized to comply with $$\sum_{j=1}^{N_i} k_j = 1$$

as required by present invention.

Figure 9:
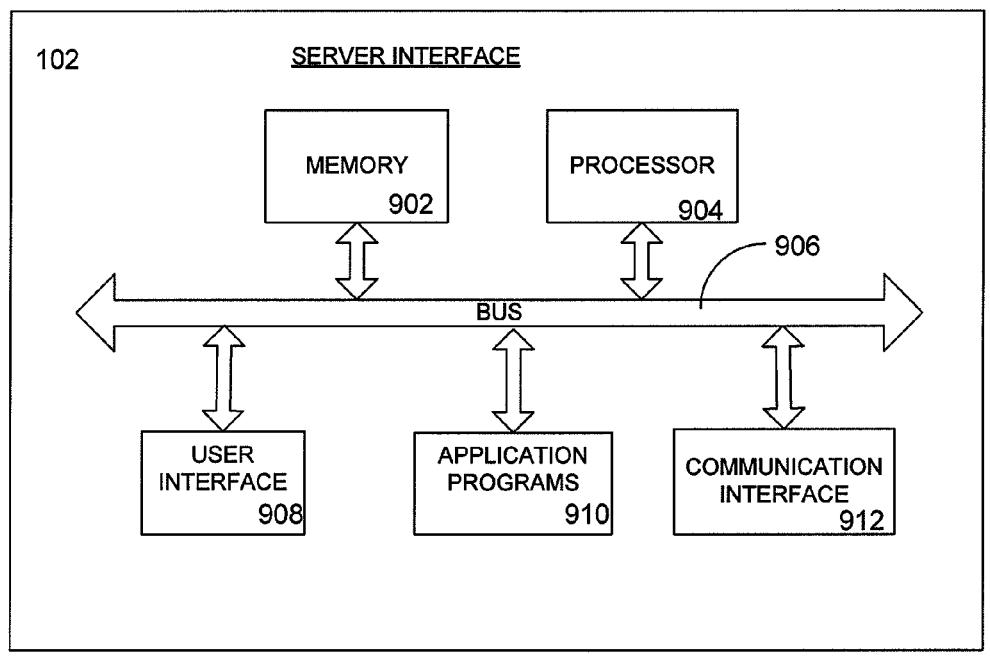
FIG. 9 illustrates a representative server interface as shown in the system of FIG. 1 in accordance with an embodiment of the invention.
Figure 11:
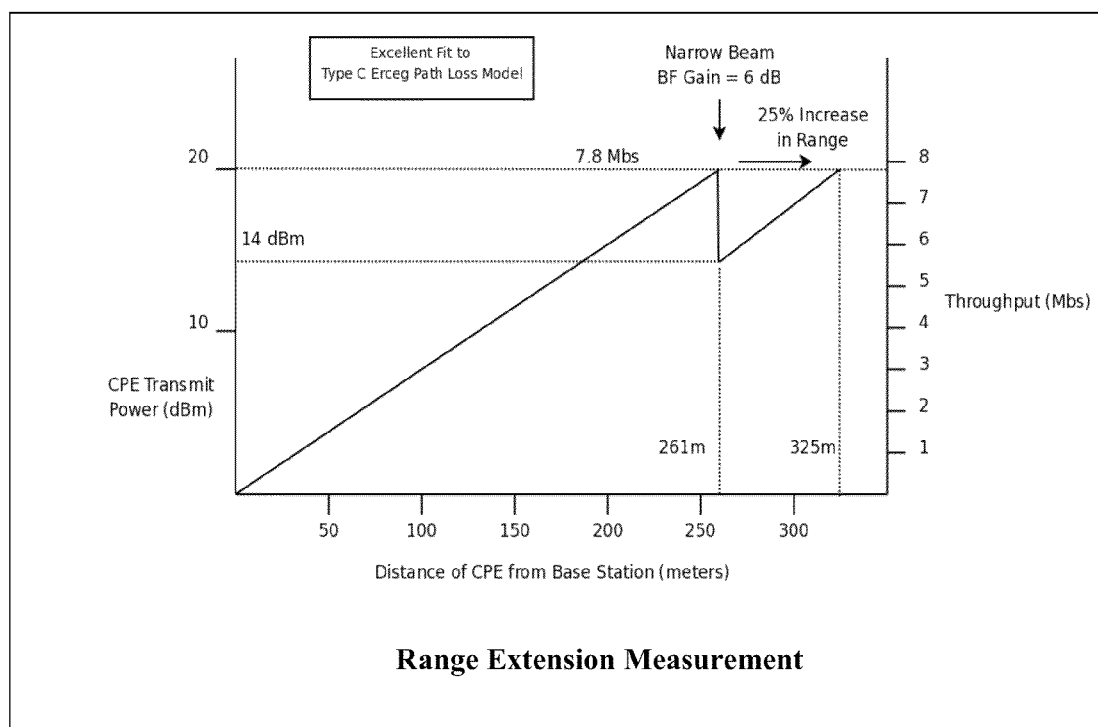
FIG. 11 is a graph illustrating an example of range extension measurements, according to an embodiment.

FIG. 9 is a representative server interface 102 as shown in the system of FIG. 1. In FIG. 11, the server interface 102 includes a memory 902, a processor 904, user interface 908, application programs 910, communication interface 912 and bus 906.

The memory 902 can be computer-readable media used to store executable instructions, computer programs, algorithms or the like thereon. The memory 902 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer programs" is intended to encompass an executable program that exists permanently or temporarily on any computer-readable medium. The instructions, computer programs and algorithms stored in the memory 902 cause the server interface 102 to execute the self-optimizing network algorithm as described above. The instructions, computer programs and algorithms stored in the memory 902 are executable by one or more processors 904, which may be facilitated by one or more of the application programs 910.

The application programs 910 may also include, but are not limited to, an operating system or any special computer program that manages the relationship between application software and any suitable variety of hardware that helps to make-up a computer system or computing environment of the server interface 102. General communication between the components in the server interface 102 is provided via the bus 906.

The user interface 908 allows for interaction between a user and the server interface 102. The user interface 908 may include a keypad, a keyboard, microphone, and/or speakers. The communication interface 912 provides for two-way data communications from the server interface 102. By way of example, the communication interface 912 may be a digital subscriber line (DSL) card or modem, an integrated services digital network (ISDN) card, a cable modem, or a telephone modem to provide a data communication connection to a corresponding type of telephone line. As another example, communication interface 912 may be a local area network (LAN) card (e.g., for Ethernet™ or an Asynchronous Transfer Model (ATM) network) to provide a data communication connection to a compatible LAN.

Further, the communication interface 912 may also include peripheral interface devices, such as a Universal Serial Bus (USB) interface, a Personal Computer Memory Card International Association (PCMCIA) interface, and the like. The communication interface 1108 also allows the exchange of information across one or more wireless communication networks. Such networks may include cellular or short-range, such as IEEE 802.11 wireless local area networks (WLANS). And, the exchange of information may involve the transmission of radio frequency (RF) signals through an antenna (not shown).

Exemplary Implementation of Building an RF Network Planning Tool from the SON Algorithm Additionally, the proposed SON algorithm relying on measured CINR values and other metrics can be applied and will work naturally in an established network where only traffic load balancing is the main issue to solve.

An additional embodiment of this invention is directed to making a network planning tool that can be used for initial network rollout until the completed installation of all the sites. For example, the following combination could be used: SON for load balancing for the active sites serving subscribers and SON as a network planning tool for newest sites to compliment the network.

It should be understood by one of ordinary skill in the art that, for the new sites not serving any subscriber yet, some assumptions regarding the propagation and path loss models have to be made. For example, one way to improve empirical propagation and path loss models is to take some DL RSSI, and possibly UL Tx Power measurements for specified CPE locations in the area not serving subscribers, and then try to estimate the parameters of the model by known methods such as least squares, curve fitting, and the like. This would be an improvement over the well documented prior art models that are classified into urban, suburban and rural environments, for example.

A clear advantage of this embodiment of the invention is a better dimensioning (i.e., required number of sites and their locations to serve a wanted number of subscribers) before rolling out the network. During network build out, the installed subscribers could be used to further improve the propagation and path loss models since additional data is available from the most recent installed subscribers. Of course, improvements in path loss models help for predicting the performance of new installations. Once subscribers are installed, there will be no need to predict their performance since actual performance data will be gathered.

Figure 10:
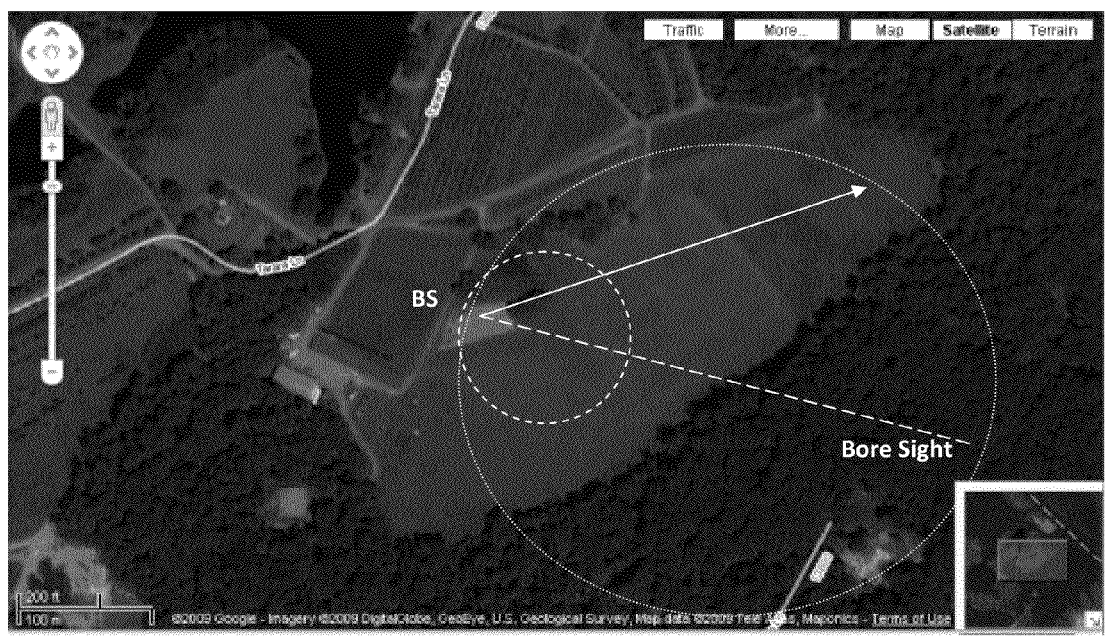
FIG. 10 illustrates an example of a location where measurements are gathered, according to an embodiment.

The illustration depicted in FIG. 10 shows an exemplary location where measurements needed to be gathered and a path loss model can be estimated in accordance with this embodiment of the invention.

In the exemplary illustration depicted in FIG. 10, an active antenna array is used at the base station that is capable of generating radiation patterns with adjustable half power beamwidth (HPBW) between 18° and 120°. The BS and CPE heights can be approximately 9 m and 3.7 m, respectively. The CPE is connected all the times and implemented in many locations in the coverage area. For example, for each location, relevant uplink and downlink measurements such as RSSI, CINR, modulation and coding scheme, throughput and UL transmit power is taken.

The widest possible beam (120°) is used to serve the CPE at the highest possible modulation and coding scheme, of 64QAM ¾, or equivalently a throughput of 7.8 Mbps for our case. The transmitted CPE power is increased with increased distance from the base station and various points are recorded. For example, at around 261 m, the CPE is able to transmit 7.8 Mbps but its transmitted power achieves the maximum of 20 dBm. Additionally, a narrow beam pointing to the CPE can be substituted for a wide beam causing the transmitted CPE power to drop to 14 dBm, but without interrupting the continuous data transfer of 7.8 Mbps. The CPE continues in the same radial direction until the CPE transmit power has reached 20 dBm again. The CPE distance at this point is approximately 325 m from the base station and the uplink data rate is maintained at 7.8 Mbps. Consequently, 6 dB beamforming gain results in around 25% range increase. Exemplary measurements are illustrated in FIG. 11.

This embodiment of the invention was applied to the test environment and the suggested path loss models for WiMAX, as described in WiMAX System Evaluation Methodology, WiMAX Forum, December 2007. More specifically, this embodiment of the invention was implemented to fit measurement points to the empirical models of WiMAX System Evaluation Methodology, WiMAX Forum, December 2007. As a result, the Type C Erceg path loss model, matched the field trials terrain very well. Since deployment scenarios can cover wider ranges than just 9 m for BS height and 3.7 m for CPE height, it would be possible to extrapolate the field measurement results to cover typical deployment scenarios and other possible beamforming gains. For example, the beamforming gain results (as discussed for this embodiment) are from narrowing down the azimuth beamwidth from 120° to a specified value. Using the empirical path loss model in link budget calculations allows the measured data to be extrapolated for various BS and CPE antenna heights. The Table below provides estimates for range increase with 64QAM ¾ under multiple deployment scenarios. It should be understood by one or ordinary skill in the art that the 25% range increase achieved was the absolute minimum that the active antenna array could achieve in more typical scenarios, which use much higher BS and CPE antenna heights.

TABLE 2

Maximum Cell Reach for Multiple Scenarios with 64QAM 3/4

| Active Antenna Array Height (m) | CPE Height (m) | Beamforming Gain (dB) | Maximum Cell Range (m) | Range Increase (%) |
|---|---|---|---|---|
| 9 | 3.7 | 0 | 261 | 0 |
| 9 | 3.7 | 6 | 325 | 25% |
| 9 | 3.7 | 9 | 376 | 44% |
| 30 | 6 | 0 | 490 | 0 |
| 30 | 6 | 6 | 686 | 40% |
| 30 | 6 | 9 | 811 | 66% |
| 100 | 6 | 0 | 727 | 0 |
| 100 | 6 | 6 | 1104 | 52% |
| 100 | 6 | 9 | 1362 | 87% |

While an embodiment of the invention has been disclosed, numerous modifications and changes will occur to those skilled in the art to which this invention pertains. The claims annexed to and forming a part of this specification are intended to cover all such embodiments and changes as fall within the true spirit and scope of the present invention.

The invention claimed is:

1. A method of modifying communication parameters of a wireless network, the wireless network having at least two antennas, and each of the antennas providing coverage to at least one sector, the method comprising:
    obtaining measurement data for at least two sectors of the wireless network;
    determining, from the obtained measurement data, whether a signal strength indicator of one or more sectors of the at least two sectors is at or below a target value;
    determining, when the signal strength indicator of the one or more sectors is at or below the target value, a communication parameter to be applied to the wireless network such that the signal strength indicator of the one or more sectors is above the target value; and
    modifying the communication parameters of the wireless network such that the determined communication parameter is applied to the wireless network, and
    the one or more sectors each having one or more modifiable vertexes,
    said determining the communication parameter includes:
        determining which of the one or more vertexes of the one or more sectors to modify;
        evaluating a cost function associated with the one or more vertexes determined to be modified; and
        determining the communication parameters to be applied to the wireless network based on the cost function evaluated to optimize the wireless network.

2. The method of claim 1, wherein said modifying the communication parameters of the wireless network such that the determined communication parameter is applied to the wireless network includes modifying antenna tilt, antenna gain, antenna beamwidth, or antenna azimuth direction of one or more of the at least two antennas.

3. The method of claim 1, wherein said modifying the communication parameters of the wireless network such that the determined communication parameter is applied to the wireless network includes modifying a transmit power of one or more basestations of the wireless network.

4. The method of claim 1, wherein the measurement data includes uplink carrier to interference plus noise ratio and/or uplink received signal strength indicator for a subscriber in one of the at least two sectors of the wireless network.

5. The method of claim 1, wherein the measurement data includes downlink carrier to interference plus noise ratio and/or uplink received signal strength indicator for a subscriber in one of the at least two sectors of the wireless network.

6. The method of claim 1, wherein the target value includes a basestation received signal strength indicator.

7. The method of claim 1, wherein said evaluating the cost function for optimizing the wireless network includes:
    receiving carrier to interference plus noise ratio for a subscriber in one of the at least two sectors;
    determining the one of the at least two sectors throughput based on the received carrier to interference plus noise ratio for the subscriber in the one of the at least two sectors;
    receiving a scheduler type and a number of subscribers for the one of the at least two sectors; and determining an average sector throughput and a minimum user throughput for the at least one of the at least two sectors.

8. The method of claim 7, wherein the communication parameters to be applied to the wireless network based on the cost function evaluated to optimize the wireless network modify antenna tilt, antenna gain, antenna beamwidth, or antenna azimuth direction of one or more of the at least two antennas such that the determined average sector throughput and the minimum user throughput for the at least one of the at least two sectors converges with a average sector throughput and minimum user throughput for an adjacent sector to the at least one of the at least two sectors; or wherein the communication parameters to be applied to the wireless network based on the cost function evaluated to optimize the wireless network modify a transmit power of one or more basestations of the wireless network such that the determined average sector throughput and the minimum user throughput for the at least one of the at least two sectors converges with a average sector throughput and minimum user throughput for an adjacent sector to the at least one of the at least two sectors.

9. A non-transitory computer readable storage medium having a program stored thereon that when executed causes a computer to perform a method of modifying communication parameters of a wireless network, the wireless network having at least two antennas, and each of the antennas providing coverage to at least one sector, the method comprising:

obtaining measurement data from at least two sectors of the wireless network;

determining, from the obtained measurement data, whether a signal strength indicator of one or more sectors of the at least two sectors is at or below a target value;

determining, when the signal strength indicator of the one or more sectors is at or below the target value, a communication parameter to be applied to the wireless network such that the signal strength indicator of the one or more sectors is above the target value; and modifying the communication parameters of the wireless network such that the determined communication parameter is applied to the wireless network, and the one or more sectors each having one or more modifiable vertexes said determining the communication parameter includes:
determining which of the one or more vertexes of the one or more sectors to modify;
evaluating a cost function associated with the one or more vertexes determined to be modified; and
determining the communication parameters to be applied to the wireless network based on the cost function evaluated to optimize the wireless network.

10. The non-transitory computer readable storage medium of claim 9, wherein said modifying the communication parameters of the wireless network such that the determined communication parameter is applied to the wireless network includes modifying antenna tilt, antenna gain, antenna beamwidth, or antenna azimuth direction of one or more of the at least two antennas.

11. The non-transitory computer readable storage medium of claim 9, wherein said modifying the communication parameters of the wireless network such that the determined communication parameter is applied to the wireless network includes modifying a transmit power of one or more basestations of the wireless network.

12. The non-transitory computer readable storage medium of claim 9, wherein the measurement data includes uplink carrier to interference plus noise ratio and/or uplink received signal strength indicator for a subscriber in one of the at least two sectors of the wireless network.

13. The non-transitory computer readable storage medium of claim 9, wherein the measurement data includes downlink carrier to interference plus noise ratio and/or uplink received signal strength indicator for a subscriber in one of the at least two sectors of the wireless network.

14. The non-transitory computer readable storage medium of claim 9, wherein the target value includes a basestation received signal strength indicator.

15. The non-transitory computer readable storage medium of claim 9, wherein said evaluating the cost function for optimizing the wireless network includes:

receiving carrier to interference plus noise ratio for a subscriber in one of the at least two sectors;

determining the one of the at least two sectors throughput based on the received carrier to interference plus noise ratio for the subscriber in the one of the at least two sectors;

receiving a scheduler type and a number of subscribers for the one of the at least two sectors; and determining an average sector throughput and a minimum user throughput for the at least one of the at least two sectors.

16. The non-transitory computer readable storage medium of claim 15, wherein the communication parameters to be applied to the wireless network based on the cost function evaluated to optimize the wireless network modify antenna tilt, antenna gain, antenna beamwidth, or antenna azimuth direction of one or more of the at least two antennas such that the determined average sector throughput and the minimum user throughput for the at least one of the at least two sectors converges with a average sector throughput and minimum user throughput for an adjacent sector to the at least one of the at least two sectors; or wherein the communication parameters to be applied to the wireless network based on the cost function evaluated to optimize the wireless network modify a transmit power of one or more basestations of the wireless network such that the determined average sector throughput and the minimum user throughput for the at least one of the at least two sectors converges with a average sector throughput and minimum user throughput for an adjacent sector to the at least one of the at least two sectors.

17. A system, comprising:
a server interface configured to modify communication parameters of a wireless network having at least two antennas, and each of the antennas providing coverage to at least one sector, said server interface is configured to obtain measurement data for at least two sectors of the wireless network, determine from the obtained measurement data, whether a signal strength indicator of one or more sectors of the at least two sectors is at or below a target value, determine, when the signal strength indicator of the one or more sectors is at or below the target value, a communication parameter to be applied to the wireless network such that the signal strength indicator of the one or more sectors is above the target value, and modify the communication parameters of the wireless network such that the determined communication parameter is applied to the wireless network, and the one or more sectors each having one or more modifiable vertexes, said determine the communication parameter includes:

determine which of the one or more vertexes of the one or more sectors to modify;

evaluating a cost function associated with the one or more vertexes determined to be modified; and determine the communication parameters to be applied to the wireless network based on the cost function evaluated to optimize the wireless network.

18. An apparatus comprising:

a server interface configured to modify communication parameters of a wireless network, the wireless network having at least two antennas, and each of the antennas providing coverage to at least one sector, obtain measurement data for at least two sectors of the wireless network, determine from the obtained measurement data, whether a signal strength indicator of one or more sectors of the at least two sectors is at or below a target value, determine, when the signal strength indicator of the one or more sectors is at or below the target value, a communication parameter to be applied to the wireless network such that the signal strength indicator of the one or more sectors is above the target value, and modify the communication parameters of the wireless network such that the determined communication parameter is applied to the wireless network, and the one or more sectors each having one or more modifiable vertexes, said determine the communication parameter includes:

determine which of the one or more vertexes of the one or more sectors to modify;

evaluate a cost function associated with the one or more vertexes determined to be modified;

determine the communication parameters to be applied to the wireless network based on the cost function evaluated to optimize the wireless network.

19. The method of claim 1, wherein the wireless network is fixed.

20. The non-transitory computer readable storage medium of claim 9, wherein the wireless network is fixed.

21. The system of claim 17, wherein the wireless network is fixed.

22. The server interface of claim 18, wherein the wireless network is fixed.

* * * * *